Nov. 5, 1940.  T. M. WRIGHT  2,220,435

AUTOMATIC PHONOGRAPH

Filed April 14, 1939  6 Sheets-Sheet 1

INVENTOR
Theodore M. Wright,
BY Walter P. Guya
ATTORNEY

Nov. 5, 1940.  T. M. WRIGHT  2,220,435
AUTOMATIC PHONOGRAPH
Filed April 14, 1939   6 Sheets-Sheet 2
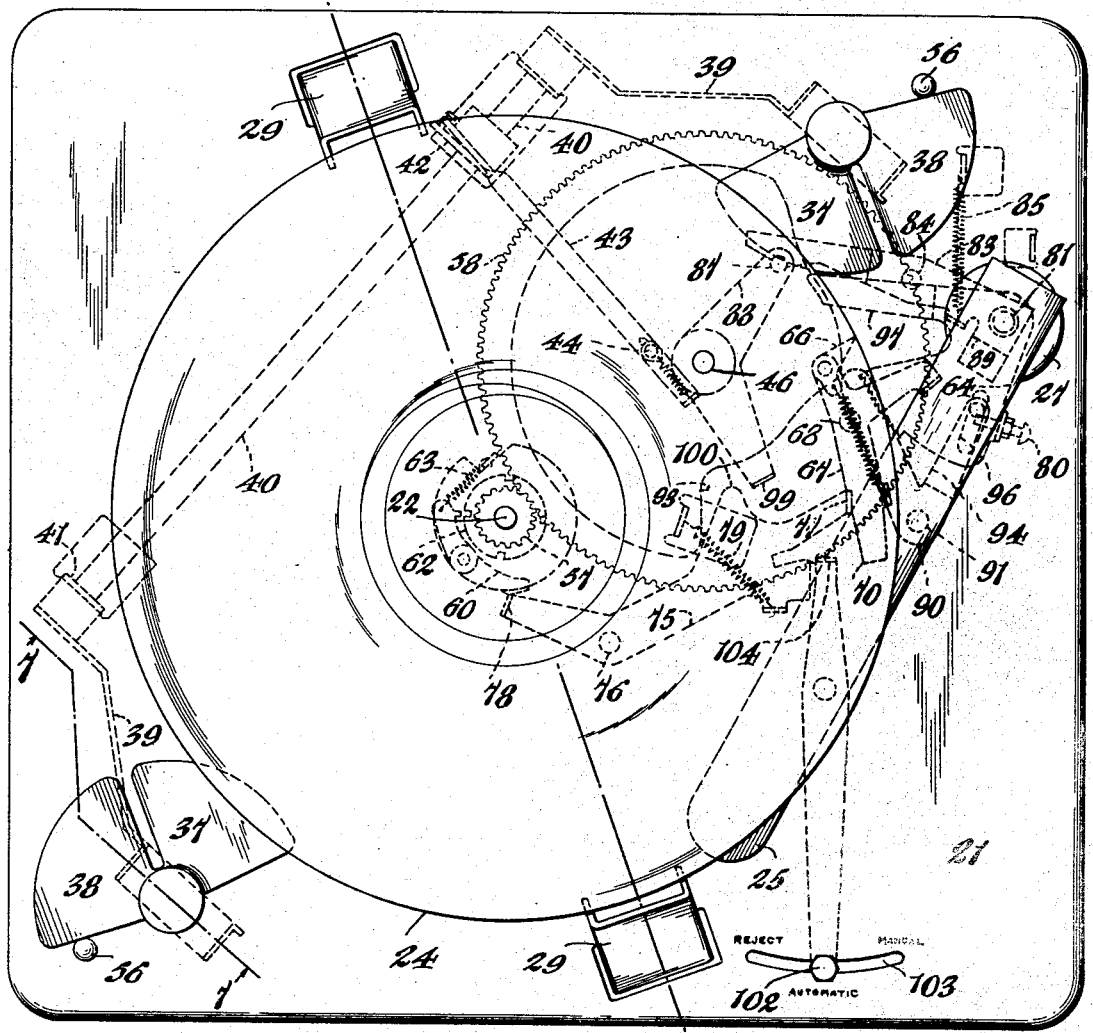
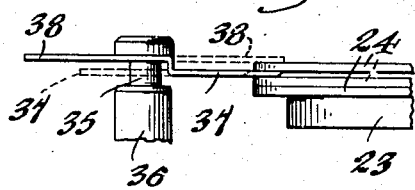
INVENTOR
Theodore M. Wright
BY Walter P. Geyer
ATTORNEY Nov. 5, 1940.                    T. M. WRIGHT                    2,220,435
                               AUTOMATIC PHONOGRAPH
                    Filed April 14, 1939         6 Sheets-Sheet 3

INVENTOR.
Theodore M. Wright,
BY
Walter P. Geyer
ATTORNEY

Nov. 5, 1940.   T. M. WRIGHT   2,220,435
AUTOMATIC PHONOGRAPH
Filed April 14, 1939   6 Sheets-Sheet 4

INVENTOR
Theodore M. Wright,
BY
Walter P. Guyer
ATTORNEY

Nov. 5, 1940. T. M. WRIGHT 2,220,435
AUTOMATIC PHONOGRAPH
Filed April 14, 1939 6 Sheets-Sheet 5
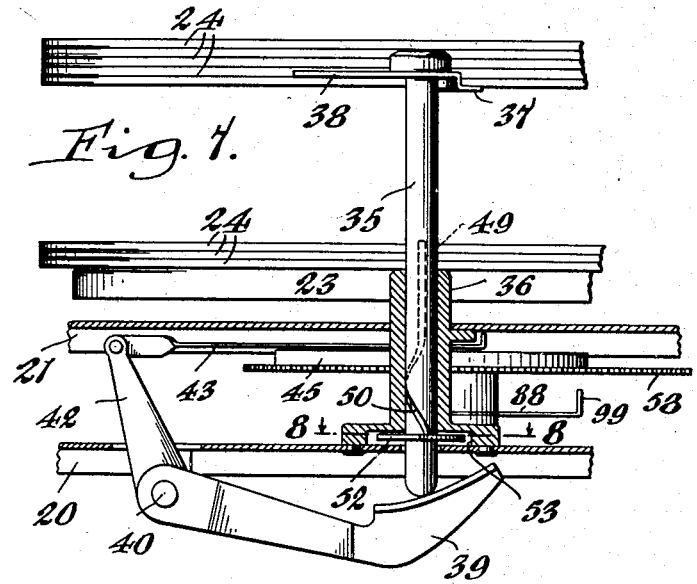
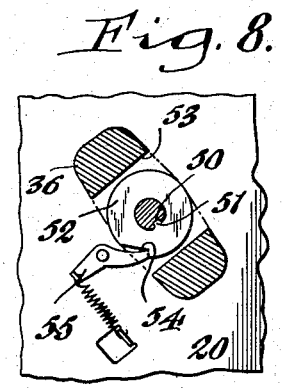
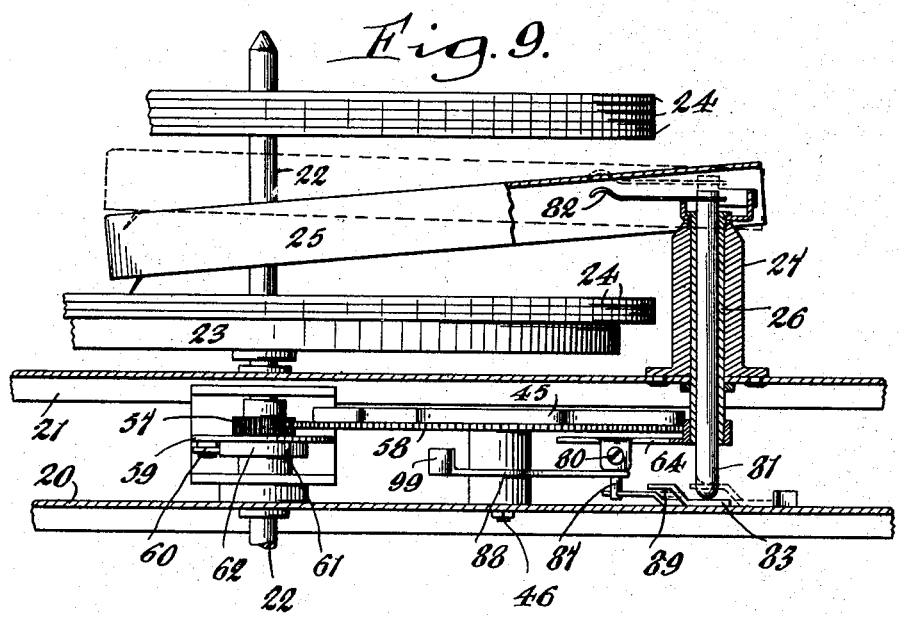
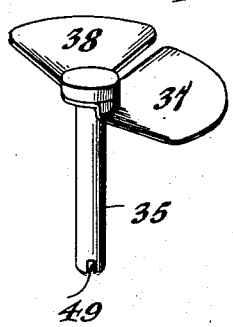
INVENTOR
Theodore M. Wright,
BY
Walter P. Geyer
ATTORNEY Nov. 5, 1940.  T. M. WRIGHT  2,220,435
AUTOMATIC PHONOGRAPH
Filed April 14, 1939  6 Sheets-Sheet 6

INVENTOR
Theodore M. Wright,
BY
Walter P. Geyer
ATTORNEY

Patented Nov. 5, 1940

2,220,435

UNITED STATES PATENT OFFICE 2,220,435

AUTOMATIC PHONOGRAPH

Theodore M. Wright, North Tonawanda, N. Y., assignor to The Rudolph Wurlitzer Company, North Tonawanda, N. Y., a corporation of Ohio Application April 14, 1939, Serial No. 267,833

22 Claims. (Cl. 274—10)

This invention relates to certain new and useful improvements in automatic phonographs, and more particularly to a multiple record phonograph for home or domestic use.

One of its objects is to provide a phonograph of this character which is simple, compact and inexpensive in construction, and which is designed to play a plurality of records in succession and whereby a given program of record selections may be automatically played from start to finish without requiring the attention of an operator.

Another object of the invention is to provide an automatic phonograph for home use wherein the records to be played are supported in a stack on the turntable, and wherein means are provided for elevating the records successively and individually after play to a storage or supporting structure disposed axially over the turntable.

A further object is to provide simple and reliable means for automatically effecting the successive transfer of the records as they are played to a point spaced above the turntable to provide an operating clearance space for the tone arm, together with automatic means initiated by the tone arm, for rendering the transfer means operable. A still further object is to provide an automatic phonograph having reliable means for actuating the tone arm to and from its playing position.

Other features of the invention reside in the construction and arrangement of parts hereinafter described and particularly pointed out in the appended claims.

Figure 1:
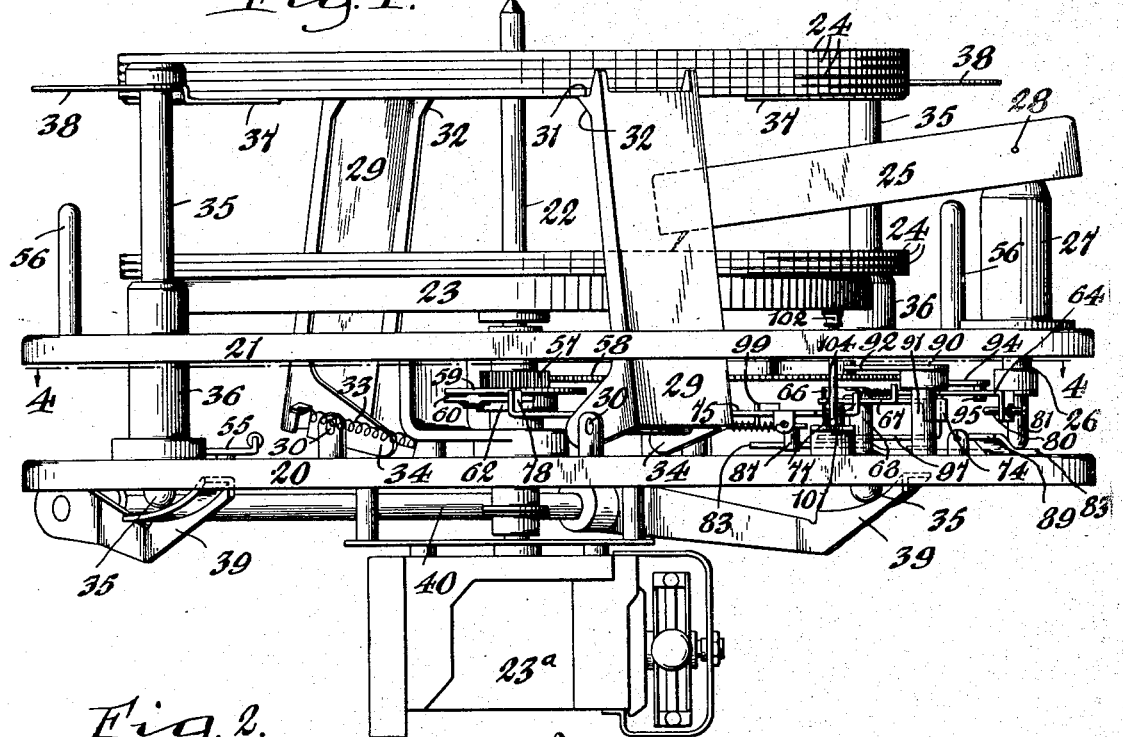
Figure 2:
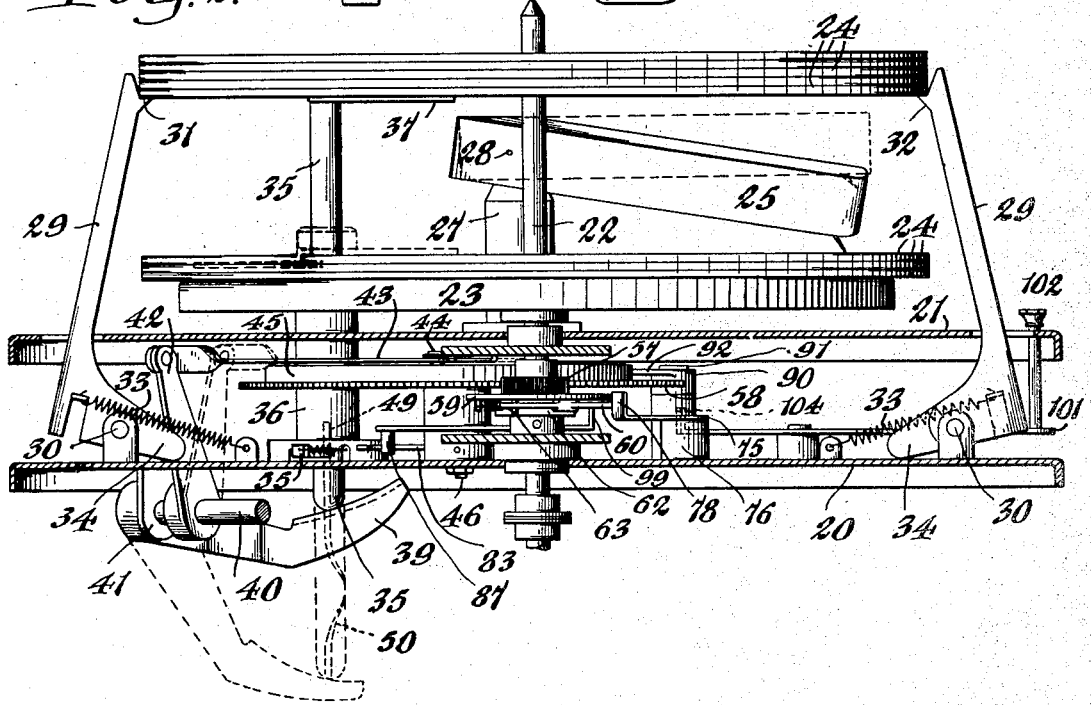
Figure 4:
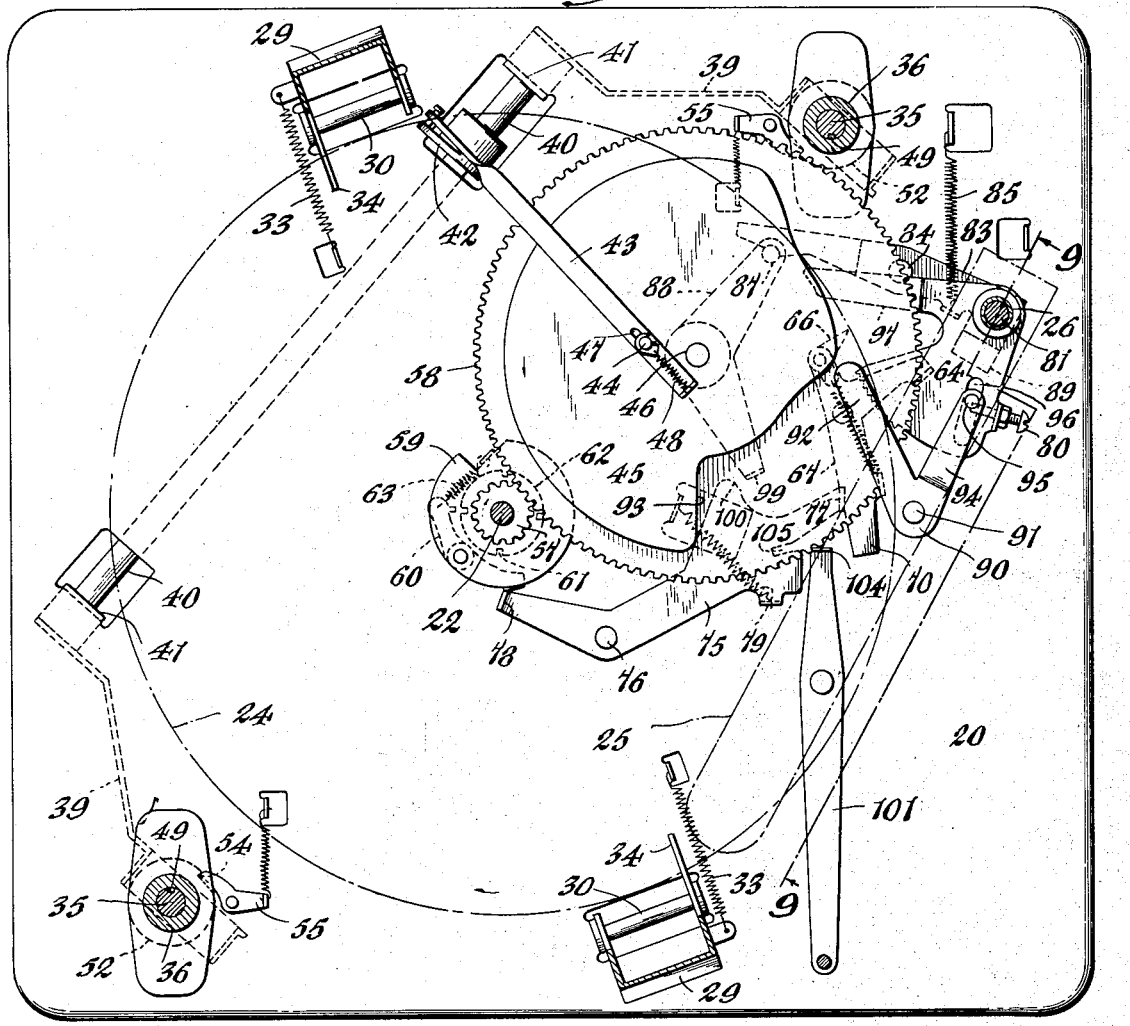
Figure 13:
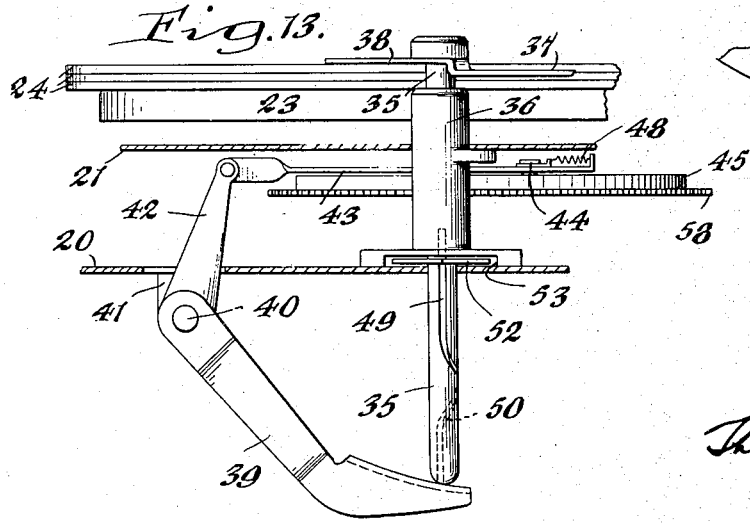
Figure 14:
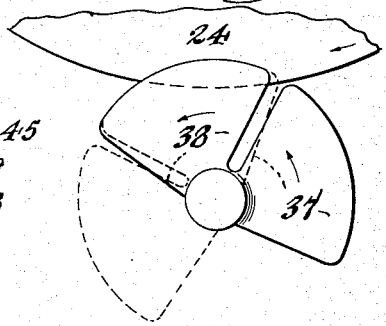
Figure 5:
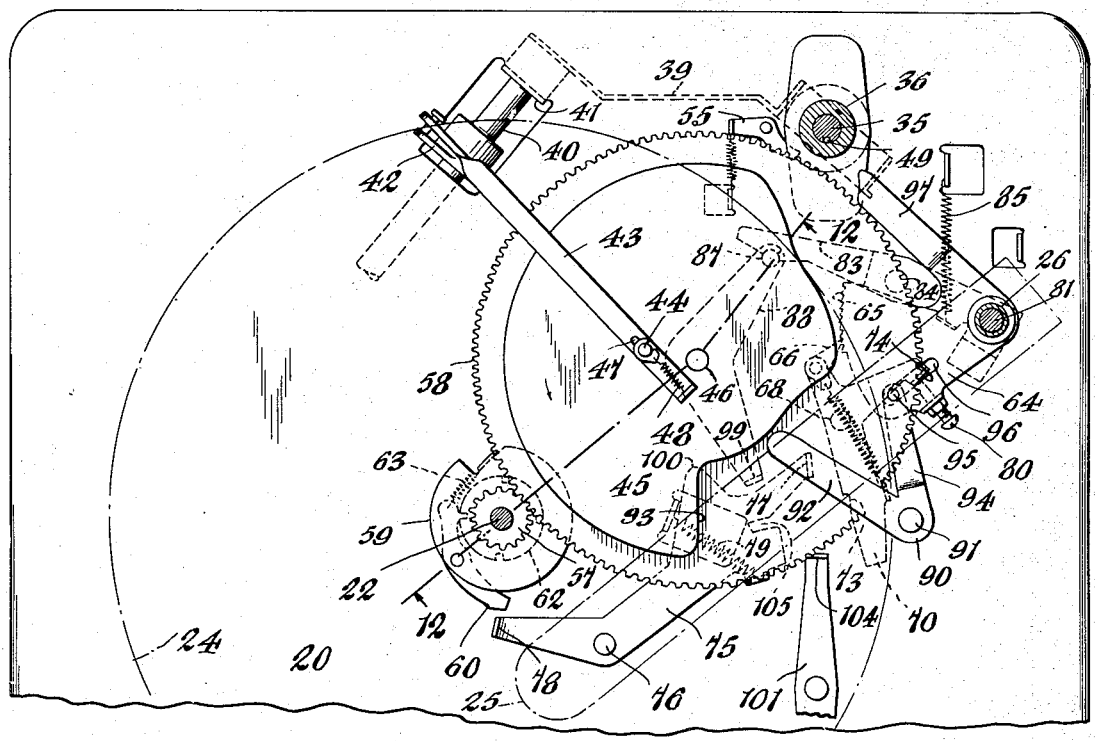
Figure 6:
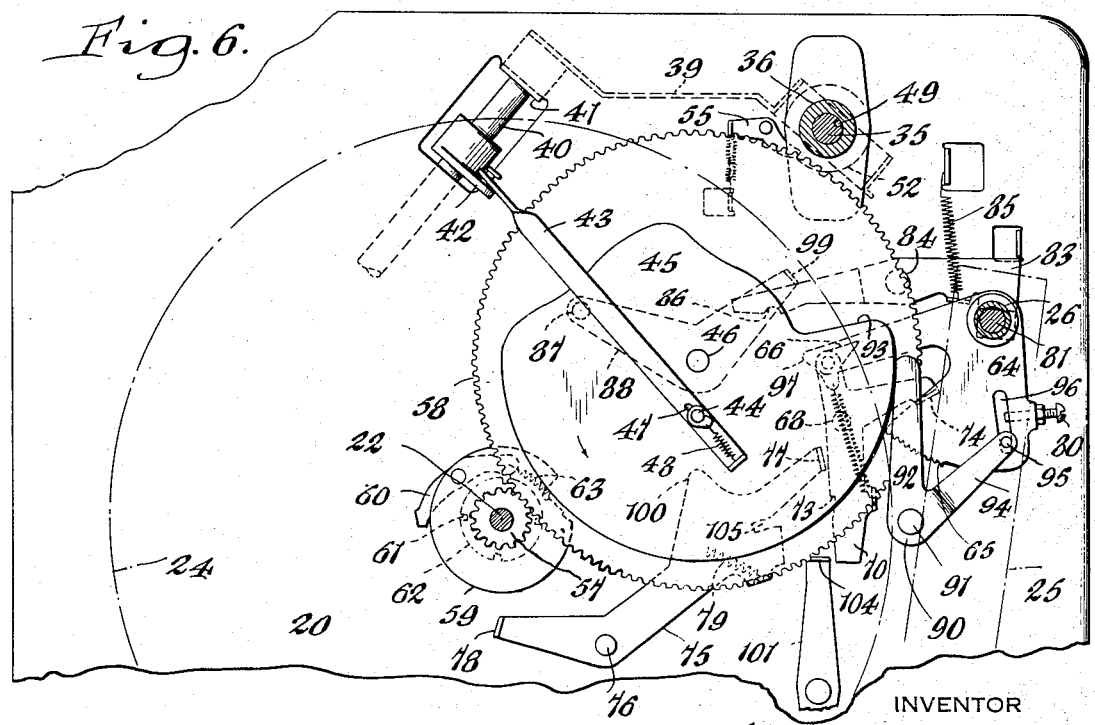
Figure 11:
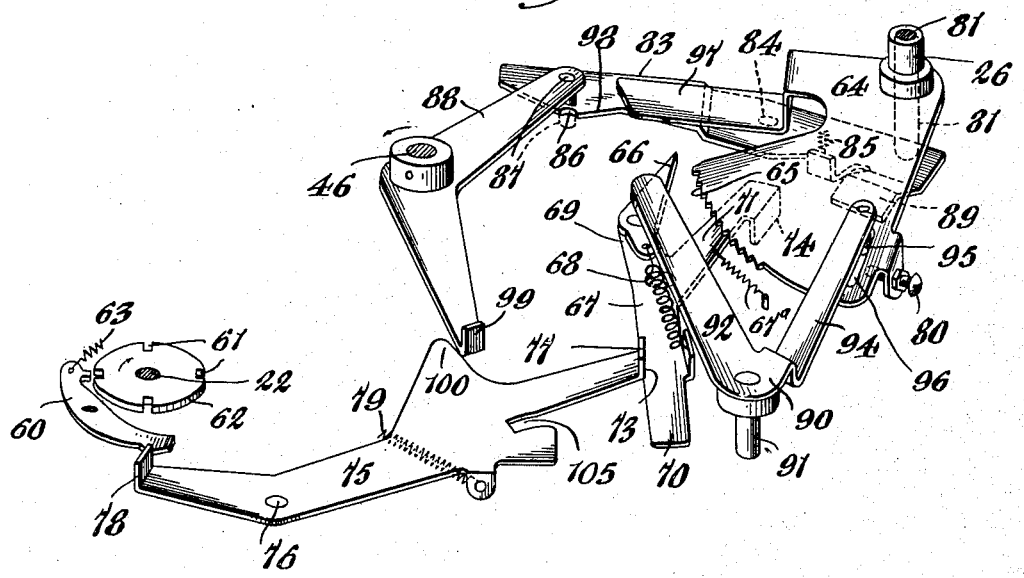
Figure 12:
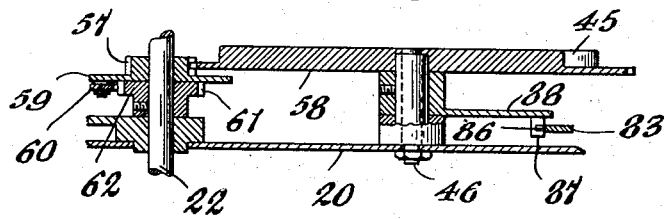

In the accompanying drawings:

Figure 1 is a front elevation of the phonograph embodying my invention, the parts being shown in playing position. Figure 2 is a sectional side elevation thereof, the sectional parts being taken substantially in the plane of line 2—2, Figure 3. Figure 3 is a top plan view of the phonograph, the parts being shown in playing position. Figure 4 is a horizontal section taken substantially in the plane of line 4—4, Figure 1. Figure 5 is a similar fragmentary sectional view showing the position of the parts in the tone arm trip position effected after the playing of a record. Figure 6 is a like fragmentary sectional view showing the position of the parts after the tone arm has been swung to non-play position at one side of the turntable. Figure 7 is a vertical section taken substantially in the plane of line 7—7, Figure 3. Figure 8 is a horizontal section taken on line 8—8, Figure 7. Figure 9 is a fragmentary vertical section taken substantially in the plane of line 9—9, Figure 4. Figure 10 is a fragmentary perspective view of one of the record-elevating spindles or units. Figure 11 is a perspective view of the tone arm controlled trip mechanism and associated parts in record playing position. Figure 12 is a transverse section taken on line 12—12, Figure 5. Figure 13 is a fragmentary side elevation, partly in section, showing one of the record-elevating spindles and associated parts in their lowered position preparatory to being moved into supporting engagement beneath a record about to be elevated. Figure 14 is a fragmentary top plan view of such parts in a like position. Figure 15 is a fragmentary side view showing a record pick-up member in position preparatory to elevating a record.

Similar characters of reference indicate corresponding parts throughout the several views.

In its general organization, this phonograph comprises a horizontally and vertically swinging tone arm, a turntable, which, during its operation, is adapted to be continuously rotated in a fixed horizontal plane and which is adapted to support a stack of records thereon for successive play from the top to the bottom of the stack; record-supporting means disposed above the turntable for receiving and supporting the records in stack-like arrangement after play in an overhead spaced relation to the next record to be played, whereby to provide an operating clearance space for the movement of the tone arm; record-elevating means movable substantially parallel to the turntable axis and laterally into engagement with a record after play for elevating and presenting it to the record-supporting mechanism; means for actuating said record-elevating means and the tone arm; and means governed by the tone arm when it reaches the end of play of a record for initiating such actuating means to in sequence lift the tone arm from the played record and swing it to one side of the turntable, elevate the played record to the record supporting means, and then swing the tone arm in and down onto the next record to be played. After the several records on the turntable have been successively played, they are then manually removed as a stack from the record-supporting means above the turntable and redeposited onto the turntable, ready for the next playing cycle.

The working parts of the phonograph are mounted on a suitable frame including a base or bottom plate 20 and a top plate 21 spaced therefrom and between which certain operating parts of the actuating mechanism are disposed. Rising from this frame substantially centrally thereof is an upright spindle 22 to which the turntable 23 is fixed, the lower end of the spindle being connected by a suitable reducing gearing to an electric motor 23ª which continuously rotates the turntable during operation of the machine. The turntable is adapted to support a plurality of superposed records 24 thereon in stack-like fashion and the spindle 22 extends sufficiently above the turntable to center the records thereon as well as to center the records when transferred from the turntable to their elevated storage position above the turntable. The numeral 25 indicates a tone arm of ordinary construction which is mounted for horizontally-swinging movement on an upright sleeve 26 journaled in a suitable bracket 27 rising from the top plate 21 at one side of the turntable, and which is pivoted at 28 to swing vertically into and out of playing engagement with the record. As shown in Figure 1, the pivot 28 is disposed a substantial distance above the top of the turntable so that the tone arm is capable of swinging downwardly into engagement with the respective records as they are successively played from the top to the bottom of the stack.

The means for supporting the records after they are played in an elevated stack in spaced relation to the turntable, and to any records borne thereby to provide an operating clearance space for the movements of the tone arm, are preferably constructed as follows:

Disposed at diametrically opposite sides of the turntable are laterally displaceable record-supporting arms 29 which may be channel shape in cross section and which are fulcrumed at their lower ends on companion pivots 30 for vertical rocking movement toward and from the axis of the turntable, while their upper ends, which extend above the stack of records on the turntable, are provided with upwardly-facing seats or shoulders 31 on which the marginal lower side of the lowest record of the elevated or transferred records is supported, as shown in Figures 1 and 2. The lower edges 32 of these arm-shoulders are beveled, as shown in Figure 2, to enable the records to slide by them and temporarily distend the arms outwardly during their elevating movements onto the shoulders. Springs 33 are connected to the arms 29 for constantly urging them inwardly in supporting engagement with the records, these arms being provided at their lower ends inwardly of their pivots 30 with stop fingers 34 which limit the inward swing of the arms.

The elevating means for automatically lifting the records one at a time after play into their storage position on the supporting arms 29 are preferably constructed as follows:

Disposed at diametrically opposite sides of the turntable between the supporting arms 29 are upright elevating spindles 35 which are rotatably and slidably mounted in bearing brackets 36 rising from the chassis-frame 20, 21 and which are provided at their upper ends with radially-disposed, record-engaging pick-up members 37 which may be slightly chamfered at their peripheral edge so as to readily enter between the record to be elevated and that record immediately beneath it. Also radiating from the upper end of each spindle in adjoining relation to the companion pick-up member 37, is a combined spindle-limiting and clutching member 38 arranged to abut flat-wise against the top record on the turntable and functioning at one time as a gauge or stop to limit the downward travel of the spindle so as to present the companion pick-up member into registering alinement between the two uppermost records on the turntable, and for which purpose these companion members 37, 38 are axially spaced a distance approximately equal to the thickness of a record as shown in Figures 13 and 15. When this spindle member 38 drops onto the marginal top side of the uppermost record on the turntable, as shown by dotted lines in Figures 2 and 15, such member functions as a clutching element and the rotation of that engaged record causes a rotating movement to be imparted to such member and to its spindle, due to the friction between the record and such member, thereby causing the member 38 to swing clear of the record stack and at the same time swing the pick-up member 37 into supporting engagement beneath the top record on the turntable, so that when the spindles are elevated that record will be lifted and be presented to the supporting arms 29. The downstroke of the spindles 35 are therefore limited by the gauge member 38 contacting the marginal top side of the uppermost record of the turntable, while the upstroke of these spindles is definitely limited at an elevation approximating the record-engaging seats 31 of the supporting arms 29.

The elevating movements of the spindles 35 are preferably controlled by vertically-swinging rock levers 39 applied to the ends of a horizontal shaft 40 journaled in suitable bearings 41 applied to the underside of the frame-plate 20, the top sides of the free ends of these levers abutting the lower ends of the spindles in the manner shown in Figures 2, 7 and 13. This shaft is adapted to be rocked in opposite directions at predetermined times to effect the raising and lowering of the spindles 35 and to this end a crank arm 42 is fixed on said shaft and is connected by a link or pitman 43 with a crank-pin 44 applied to an intermittently rotatable cam 45 journaled on an upright stub-shaft 46 disposed between the frame plates 20 and 21. This crank-pin engages a longitudinal slot 47 in the pitman and the inner end of this pitman is connected by a coil spring 48 to the pin so as to constantly urge the pitman toward the inner end of the slot in abutting engagement with the crank pin and at the same time permit, when required, a slight lost motion action between the respective parts.

After a played record has been elevated onto the supporting arms 29, the spindles 35 remain elevated during the playing of the next record and spindle members 37 and 38 assume the positions shown in Figures 1 and 7 with the pick-up member 37 still disposed beneath the bottom record in the elevated stack. During the lowering movement of the spindles preparatory to picking up the played record, a counter-clockwise movement is imparted to this spindle for swinging the pick-up members 37 outwardly clear of the peripheries of the records but in adjoining edgewise relation thereto, and for bringing the gauge members 38 inwardly to a point over the marginal top side of the top record on the turntable. For this purpose, each spindle 35 is provided with a longitudinal groove which includes an upper straight portion 49 and a spiral portion 50 which extends approximately halfway around the spindle. Arranged to cooperate with this slot is a key 51 formed on a disk or washer 52 loosely fitted about the spindle and held against endwise movement relative thereto in a socket 53 formed between the spindle bracket 36 and the bottom plate 20 of the chassis-frame, as shown in Figures 7 and 8. In its periphery the disk 52 has a locking notch 54 with which a pivoted spring-pressed pawl 55 is adapted to engage for normally preventing rotation of the disk in a clockwise direction. In the elevated position of each spindle, shown in Figure 7, the lower end of the spiral portion 50 of its groove is in register with the disk key 51, so that during the initial downstroke of the spindle it is turned relatively to the disk in a counter-clockwise direction to release the pick-up member 37 from the record and present the gauge member 38 into the marginal plane of the top record on the turntable. During this partial rotation of the spindle the pawl 55 holds the washer against rotation in a clockwise direction. When the gauge member 38 strikes the marginal face of the rotating top record on the turntable, it being understood that the turntable rotates continuously during the operation of the phonograph, the frictional contact therewith causes the turning of the spindle in a counter-clockwise direction, the pawl permitting the disk 52 to turn bodily or as a unit with the spindle to bring the pick-up member 37 beneath the record to be elevated. At this time, the disk-key 51 is engaged with the straight portion 49 of the spindle-groove, so that during the subsequent elevating movement of the spindle the key first rides in the straight portion of the spindle-groove and during the last portion of the upward travel the key rides in the spiral portion 50 of the groove and turns in a counter-clockwise direction relative to the spindle until the pawl 55 drops into the notch 54 which occurs when the spindles 35 reach their full upward travel, and during this full up-stroke the record pick-up and gauge members 37 and 38, respectively, remain in their last projected position. In order to prevent the spindle being turned too far by the frictional contact of its gauge member 38 with the rotating record, an upright stop pin 56 rises from the top plate 21 of the chassis-frame, as shown in Figure 3, in the path of rotating movement of the gauge member 38 when the spindle is in its lowered position.

The means for transmitting motion to the cam 45 in a counter-clockwise direction at predetermined times to automatically govern the elevating movements of the spindles 35, as well as to control the movements of the tone arm to and from play position, are constructed as follows:

Loosely mounted on the lower end of the turntable-spindle 22 between the frame plates 20 and 21, is a pinion 57 which constantly meshes with a gear 58 which may be a part of or fixed to the cam 45 in order to turn therewith. Attached to this pinion is a circular plate 59 on which a horizontally swinging clutching pawl 60 is mounted for releasable clutching engagement with one or another of an annular row of notches 61 formed in a collar 62 fixed on the turntable-spindle adjoining said plate. A spring 63 is connected to this pawl for constantly urging it into its clutching position shown in Figures 5 and 6, which is the record-changing position. When the pawl is in its clutched position, motion is transmitted from the spindle to the collar and thence through the pawl and disk to the pinion 57 and gear 58 to rotate the cam 45 in a counter-clockwise direction. During the record-changing cycle this cam makes one revolution, during which time the tone arm is lifted from the played record and swung to one side of the turntable, the elevating spindles are lowered and raised to pick-up the played record and present it to the overhead supports, and the tone arm then swung in and dropped onto the playing groove of the next exposed record in the stack.

When the tone arm reaches the end of playing a given record, it initiates a mechanism for causing the clutching pawl 60 to engage the notched collar 61 to transmit motion to the cam 45. This mechanism consists of a segmental plate 64 fixed to the lower end of the tone arm-bearing sleeve 26 to swing horizontally therewith and having at its periphery a row of ratchet teeth 65 with which a trip pawl 66, pivoted to a horizontally-swinging latching lever 67, is adapted to engage during the final feed-in stroke of the tone arm. This latching lever is pivoted at 68 and has a spring 67ª connected thereto for normally urging it to a latching position and includes arms 69, 70 and 71, the pawl 66 being pivoted to the arm 69 and having a spring 72 connected thereto for urging the pawl into engagement with the ratchet teeth 65. The arm 70 of this lever is provided with a locking notch 73 while the arm 71 is provided at its outer end with a depending lug 74. The numeral 75 indicates a horizontally-swinging, clutch-controlling tappet lever pivoted intermediate its ends at 76 and having a lug 77 at its outer end adapted to interlock with the notch 73 in the clutch-releasing or record-playing position, shown in Figures 3, 4 and 11, while the inner end of said lever is provided with a lug 78 disposed in cooperative relation with the free end of the clutching pawl 60. A spring 79 connected to the lever 75 constantly urges it in a direction to free its lug 78 from the clutching pawl and permit the spring 63 connected to the pawl to urge it into its clutching position. Thus, when the needle of the tone arm encounters, say, an eccentric lead-in groove in the record, it causes a displacement of the lever 67 in a direction to release its locking notch 73 from the lug 77 of the lever 75, whereupon the spring 79 urges such lever to a position released from the clutching pawl to allow the latter to be automatically moved to its clutching position to cause motion to be transmitted from the pinion 57 to the gear 58 and cam 45. Should the record be the concentric type of lead-in groove, then a screw 80 applied to the segmental plate 64 is adapted to encounter the depending lug 74 of the lever 67 to rock such lever in a direction to release its notch 73 from engagement with the tappet lever 75 and in the same manner cause the engagement of the clutching pawl 60 to transmit motion to the gear 58 and cam 45.

The initial turning movement of the cam 45 in the manner just described governs a means for lifting the tone arm out of contact with the record after play. For this purpose, an elevating pin 81 extends through the tone arm sleeve 26 and is provided at its upper end with a tappet arm 82 which is adapted, when the pin is lifted, to contact the tone arm outwardly of its pivot 28 and elevate the tone arm from the full line position to the dotted line position shown in Figure 9. The lower end of this elevating pin normally rests upon the contiguous top side of a lever 83 pivoted intermediate its ends at 84 for horizontally-swinging movement, and having a spring 85 connected to it for urging such lever in a direction to bring a locking notch 86 provided in the inner edge of the free end thereof into latching engagement with a pin 87 applied to one arm of a bell crank lever 88 fixed on the lower end of the cam-stub-shaft 46. Extending laterally from that end of the lever 83 on which the elevating pin 81 normally rests, is an elevating cam or upwardly-offset lug 89 which is adapted, when said lever is rocked in a direction toward the pin to present its cam thereto, to elevate the pin and in turn lift the tone arm from the record. When the tone arm effects the tripping of the pawl 60 to its clutch-engaging position, motion is transmitted to the cam 45 and its shaft 46, whereupon the bell crank lever 88 is turned in a counter-clockwise direction and its pin 87 is released from latching engagement with the notch 86 in the lever 83, whereupon the spring 85 rocks the latter in a direction to bring its cam lug 89 beneath the pin and automatically lift the tone arm from the record.

The continued movement of the cam effects the outward swing of the tone arm to its initial or non-play position and this is effected through the medium of a horizontally-swinging, bell-crank lever 90 fulcrumed at 91 adjacent the periphery of the cam and having the arm 92 thereof disposed in the path of travel of the cam face 93 while its other arm 94 is connected by a pin and slot connection 95, 96 with the adjoining end of the segmental toothed plate 64. By this construction, as the cam face 93 encounters the lever arm 92 it gradually rocks the same in a clockwise direction, viewing Figure 5, and in turn rocks the plate 64 outwardly to in turn swing the tone arm to the position shown in Figure 6.

After the tone arm has been brought to its non-play position, the cam 45 continues rotating and automatically actuates the record-elevating spindles 35, first down and then up, through the medium of the rock levers 39, to transfer the played record onto the supports 29, and during this time the arm 92 of the tone arm actuating lever 90 rides the peripheral concentric face of the cam. The bell-crank lever 88 also rotates with the cam and disposed in the path of rotation of its pin 87, and near the end of the rotating cycle of the cam, is an extension 97 of the segmental plate 64. When this pin encounters the extension 97, it causes the turning of the segmental plate 64 in a direction to swing the tone arm inwardly over the marginal top side of the record to be played, and immediately thereafter, or substantially so, the pin 87 encounters the beveled edge 98 of the lever 83 and swings it in a direction to bring its cam-lug 89 from beneath the elevating pin 81 to permit the latter to drop by gravity and allow the tone arm to swing downwardly to bring its stylus onto the playing groove of the record. Just prior to the pin 87 encountering the locking notch 86 in the lever 83, a lug 99 on the other arm of the bell-crank lever is adapted to engage a lateral, inner extension 100 on the tappet lever 75 and rock such lever in a direction to bring its inner lug 78 into engagement with the clutching pawl 60 and swing such pawl to its clutch-releasing position, the lug 77 at the opposite end of this tappet lever being at the same time brought into engagement with the locking notch 73 in the three-armed lever 70. The moment that the clutching pawl 60 is swung to its released position, the cam 45 and bell crank lever 88 are brought to rest, with the parts assuming the positions shown in Figures 3, 4, 5 and 11, during the playing of a record.

In order that the user may manually control the clutch-control mechanism, so as to render the record-transferring and tone arm actuating mechanism inoperative, as when it is desired to repeat a record or continuously play it, as is done in an ordinary single record phonograph, or to reject a record which is set for play but which it is not desired to hear, I provide a manually-movable lever 101 pivoted intermediate its ends between the frame-plates 20, 21 and having an operating knob 102 at its outer end extending upwardly through a slot 103 in the top plate 21. At its inner end this lever has an upstanding lug 104 which, when said lever is shifted to the right or to "manual" position (see Figure 3), engages a notch 105 formed in the adjoining end of the clutch-controlling tappet lever 75 and latches such lever in pawl-released position, so that the automatically-controlled mechanisms of the phonograph are rendered inoperative, and the records and tone arm manipulated by hand. When the lever 101 is moved to the left or to "reject" position, its lug 104 encounters the outer end of the arm 70 of the latching lever 67 and shifts such lever in a direction to release it from the lug 77 of the clutch-control tappet lever 75 and permit the clutch pawl 60 to move to its clutch-engaging position, and thereby render the automatically-controlled mechanisms of the phonograph immediately operative to stop the playing of the record then on the turntable and bring the next one into play. When the lever 101 is in neutral or "automatic" position, its lug 104 is clear of the tappet lever notch 105 and the lever-arm 70, so as not to interfere with the normal automatic operation of the phonograph.

I claim as my invention:

1. A phonograph of the character described, comprising a turntable to support a stack of records thereon, for successive play from top to bottom of the stack, supports disposed at a predetermined elevation above the turntable and in overhanging relation to the marginal edges of the records thereon for receiving and supporting the records after they are played, means releasably engageable with the records for elevating them onto said supports after play, and means operatively connected to said elevating means for causing them to be brought into and out of engagement with the records at predetermined times.

2. In an automatic phonograph, a turntable for supporting a stack of records to be reproduced while supported thereon, record-supporting means disposed in operative relation with said turntable for receiving and supporting the records successively one below the other in stack-like arrangement after play and in overhead, spaced relation to the next record to be played, and record-elevating means disposed for engagement with the marginal edges of the records and movable substantially parallel to the turntable-axis and engageable with a record after play for elevating and presenting it to said record-supporting means.

3. In an automatic phonograph, a turntable adapted to support a plurality of superposed records thereon, means disposed substantially in concentric relation with the turntable and having a record-engaging element thereon arranged above the plane of the turntable for receiving and supporting the records after they are played in overhead spaced relation to the next record to be played, and record-elevating means movable substantially parallel to the turntable-axis and between the turntable and said record-engaging element for successively presenting the records after play to the latter, said elevating means having members thereon movable at predetermined times into and out of supporting engagement with a record.

4. In an automatic phonograph, a turntable for supporting a stack of records to be reproduced while supported thereon, record-supporting means disposed at a predetermined elevation above said turntable for receiving and supporting the records in stack-like arrangement after play and in overhead, spaced relation to the next record to be played, record-elevating means movable substantially parallel to the turntable-axis and engageable with a record after play for elevating and presenting it to said record-supporting means, a sound reproducing unit movable in the space provided over the record to be played and mounted to swing vertically for playing engagement at the respective elevations of the records on the turntable, means for actuating said record-elevating means and said reproducing unit in predetermined sequence, and means governed by said sound reproducing unit for initiating said actuating means.

5. In an automatic phonograph, a turntable adapted to support a plurality of superposed records thereon, laterally-displaceable supporting means disposed substantially in concentric relation with the turntable and having record-engaging elements thereon arranged above the plane of the turntable for receiving and supporting the records after they are played in overhead, spaced relation to the next record to be played, means acting on said supporting means for yieldingly resisting their displacement out of normal record-engaging position, and record-elevating means movable substantially parallel to the turntable-axis and engageable with a record after play for elevating and presenting it to said record-supporting means.

6. In an automatic phonograph, a turntable adapted to support a plurality of superposed records thereon, pivoted supports disposed substantially in concentric relation with the turntable for swinging movement toward and from its axis and having seats thereon arranged above the plane of the turntable for receiving and supporting the records at their marginal edges after play, springs applied to said supports for constantly urging them to record-engaging position, and record-elevating means movable into engagement with a record on the turntable for elevating and presenting it to said pivoted supports.

7. In an automatic phonograph, a turntable for supporting a stack of records to be reproduced while supported thereon, record-supporting means disposed in operative relation with said turntable for receiving and supporting the records in stack-like arrangement after play and in overhead, spaced relation to the next record to be played, and record-elevating means disposed about and movable substantially parallel to the turntable-axis and engageable with a record on the turntable for elevating and presenting it to said record-supporting means, said elevating means including record pick-up members disposed in edgewise relation to the records for swinging movement into and out of supporting engagement with the marginal edge of a record.

8. In an automatic phonograph, a turntable for supporting a stack of records to be reproduced while supported thereon, record-supporting means disposed in operative relation with said turntable for receiving and supporting the records in stack-like arrangement after play and in overhead, spaced relation to the next record to be played, and record-elevating mechanism disposed in operative relation to the records on the turntable for transferring a record from the turntable to said supporting means, said elevating mechanism including a plurality of spindles guided for vertical and rotative movements, record pick-up members applied to said spindles for movement therewith into and out of supporting engagement with the marginal edge of a record, means operatively engageable with said spindles for controlling their vertical movements, and means operatively connected to said spindles for controlling the rotation thereof.

9. In an automatic phonograph, a turntable for supporting a stack of records to be reproduced while supported thereon, record-supporting means disposed in operative relation with said turntable for receiving and supporting the records in stack-like arrangement after play and in overhead, spaced relation to the next record to be played, and record-elevating mechanism disposed in operative relation to the records on the turntable for transferring a record from the turntable to said supporting means, said elevating mechanism including a plurality of spindles guided for vertical and rotative movements and each having a record pick-up member thereon for releasable supporting engagement with the marginal edge of a record, means operatively engageable with said spindles for controlling their vertical movements, means operatively engageable with and governed by the downstroke of each spindle for rotating the latter to bring its companion pick-up member clear of the transferred record, and means applied to said spindles and disposed for driving engagement with the top record on the turntable during the down-stroke of the spindles for causing momentary rotation of the latter in a direction to present their pick-up members in supporting engagement beneath such top record, said record-engaging means being simultaneously swung clear of such record.

10. In an automatic phonograph, a turntable for supporting a stack of records to be reproduced while supported thereon, record-supporting means disposed in operative relation with said turntable for receiving and supporting the records in stack-like arrangement after play and in overhead, spaced relation to the next record to be played, rotatable elevating spindles movable substantially parallel to the turntable-axis, and a pair of members disposed radially of each spindle in axially spaced relation thereon, one of said members constituting a pick-up engageable with the marginal underside of a record and the companion member constituting an abutment engageable with the top side of the record for controlling the registration of the first-named member with such record.

11. In an automatic phonograph, a turntable for supporting a stack of records to be reproduced while supported thereon, record-supporting means disposed in operative relation with said turntable for receiving and supporting the records in stack-like arrangement after play and in overhead, spaced relation to the next record to be played, rotatable elevating spindles movable substantially parallel to the turntable-axis, a pair of members disposed radially of each spindle in axially spaced relation thereon, one of said members constituting a pick-up engageable with the marginal underside of a record and the companion member constituting an abutment engageable with the top side of the record for controlling the registration of the first-named member with such record, means operatively engageable with said spindles for controlling their elevating movements, said abutment members limiting the downstroke of the spindles and constituting clutching elements for frictional engagement with the top record in the stack to impart a rotative movement to the spindles and bring the companion pick-up members into supporting engagement with such top record and the abutment members clear of the same, and means operatively engageable with said spindles, while elevated, for causing the turning thereof in a direction to disengage their pick-up members from the record and to present their abutment members in the marginal plane of the record-stack.

12. In an automatic phonograph, a turntable for supporting a stack of records to be reproduced, and means for successively transferring each record after play to a position spaced above the turntable, said means including elevating spindles disposed adjacent the turntable and having means thereon releasably engageable with the top record of the stack for limiting their down stroke and other means releasably engageable beneath the top record for supporting it during transfer above the turntable.

13. In an automatic phonograph, a turntable for supporting a stack of records to be reproduced, and means for successively transferring each record after play to a position spaced above the turntable, said means including rotatable, elevating spindles disposed adjacent the turntable and each having a pair of radially and axially spaced record-engaging elements fixed thereon, one of said elements being adapted for engagement with the marginal top side of a record on the turntable at one time and the other element being adapted for engagement with the marginal underside of such record at another time, and means operatively associated with said spindles for governing their rotative movements to present and release such elements at predetermined times into and out of engagement with a record.

14. In an automatic phonograph, a turntable for supporting a stack of records to be reproduced, and means for successively transferring each record after play to a position spaced above the turntable, said means including rotatable, elevating spindles disposed adjacent the turntable and each having a pair of radially and axially spaced record-engaging elements fixed thereon, one of said elements being adapted for engagement with the marginal top side of a record on the turntable at one time and the other element being adapted for engagement with the marginal underside of such record at another time, each of said spindles having a longitudinal groove therein including a straight portion and a spiral portion, a member loosely mounted on each spindle and held against axial movement relative thereto, said member having a key thereon in engagement with said spindle-groove, means for releasably latching said member against turning in one direction, and means engageable with said spindles for raising and lowering them relative to said companion spindle-engaging members.

15. In an automatic phonograph, a turntable for supporting a stack of records to be reproduced, record-elevating means for successively transferring each record after play to a position spaced above the turntable, a sound reproducing unit mounted to swing both horizontally and vertically relatively to the record, means adapted to be driven from the turntable-spindle and including a clutch device, operative connections between said driven means and said record-elevating means and said reproducing unit, respectively, for actuating in sequence the vertical and horizontal swinging movements of the reproducing unit from play to non-play position, the movement of said elevating means to a record-transferring position, and the horizontal and vertical swinging movements of said reproducing unit to record-play position, and means operatively connected to said clutch device for governing its clutched and released positions, said reproducing unit including connections to said clutch-governing means for rendering the same operative to automatically engage the clutch when the playing of a record is completed, and said driven means including a part engageable with said clutch-governing means at a predetermined time for restoring the clutch to its released position.

16. In an automatic phonograph, a turntable for supporting a stack of records to be reproduced, record-elevating means for successively transferring each record after play to a position spaced above the turntable, a sound reproducing unit mounted to swing both horizontally and vertically relatively to the record, means adapted to be driven from the turntable-spindle and including a clutch device, operative connections between said driven means and said record-elevating means and said reproducing unit, respectively, for actuating in sequence the vertical and horizontal swinging movements of the reproducing unit from play to non-play position, the movement of said elevating means to a record-transferring position, and the horizontal and vertical swinging movements of said reproducing unit to record-play position, and means operatively connected to said clutch device for governing it including a tappet lever, a latching member releasably engageable with said lever for normally holding it in clutch-released position, a trip mechanism interposed between said latching member and said reproducing unit for actuating the former to unlatch said tappet lever to clutch-engaging position, and a member on said driven means engageable with the tappet lever at a predetermined time for restoring it in latched, clutch-releasing engagement with said latching member.

17. In an automatic phonograph, a turntable for supporting a stack of records to be reproduced, record-elevating means for successively transferring each record after play to a position spaced above the turntable, a sound reproducing unit mounted to swing both horizontally and vertically relatively to the record, means adapted to be driven from the turntable-spindle and including a clutch device, operative connections between said driven means and said record-elevating means and said reproducing unit, respectively, for actuating in sequence the vertical and horizontal swinging movements of the reproducing unit from play to non-play position, the movement of said elevating means to a record-transferring position, and the horizontal and vertical swinging movements of said reproducing unit to record-play position, means operatively connected to said clutch device for governing its clutched and released positions, said reproducing unit including connections to said clutch-governing means for rendering the same operative to automatically engage the clutch when the playing of a record is completed, and said driven means including a part engageable with said clutch-governing means at a predetermined time for restoring the clutch to its released position, and manually-actuated means disposed in operative relation with said clutch-governing means and said reproducing unit connections and movable from a neutral inoperative position to an interlocking position with the clutch-governing means to retain it in clutch-released position, said manual means being movable to another position into operative engagement with one of the connections associated with the sound reproducing unit for rendering the same operative to effect the actuation of the clutch-governing means to clutch-engaging position.

18. In an automatic phonograph, a turntable for supporting a stack of records to be reproduced, record-elevating means for successively transferring each record after play to a position spaced above the turntable, a sound reproducing unit mounted to swing both horizontally and vertically relatively to the record, means adapted to be driven from the turntable-spindle and including a clutch device, operative connections between said driven means and said record-elevating means and said reproducing unit, respectively, for actuating in sequence the vertical and horizontal swinging movements of the reproducing unit from play to non-play position, the movement of said elevating means to a record-transferring position, and the horizontal and vertical swinging movements of said reproducing unit to record-play position, means operatively connected to said clutch device for governing it including a tappet lever, a latching member releasably engageable with said lever for normally holding it in clutch-released position, a trip mechanism interposed between said latching member and said reproducing unit for actuating the former to unlatch said tappet lever to clutch-engaging position, and a member on said driven means engageable with the tappet lever at a predetermined time for restoring it in latched, clutch-releasing engagement with said latching member, and a manual control lever disposed in operative relation to said tappet lever and said latching member and movable from a neutral inoperative position to one or the other of two operative positions, said control lever having a part thereon adapted to interlock with said tappet lever in one of its operative positions to latch the latter against movement to a clutch-engaging position and adapted to engage said latching member in the other of its operative positions to release the same from said tappet lever and permit its movement to clutch-engaging position.

19. In an automatic phonograph, a turntable for supporting a stack of records to be reproduced while supported thereon, retractable record-supporting means disposed in operative relation with the turntable for receiving and supporting the records at their marginal edges in stack-like arrangement after play and in overhead spaced relation to the next record to be played, record-elevating means having members thereon movable at a predetermined time into engagement with the marginal edge of a played record for elevating and presenting it to said retractable record-supporting means, said record-engaging members being movable at another time from engagement with such elevated record into engagement with the next record to be elevated for automatically positioning said members to effect the elevation of such record, and mechanism for actuating said elevating means and its record-engaging members.

20. In an automatic phonograph, a turntable for supporting a stack of records to be reproduced while supported thereon, the turntable having a record-centering spindle rising therefrom, a record supporting means disposed at a predetermined elevation above said turntable and in independent, disconnected relation to its spindle for receiving and supporting the discarded records in a stack-like arrangement after play and in axial overhead spaced relation to the next record to be played, said discarded records being thereby supported until all the remaining records on the turntable have been reproduced, and means for discarding each record after play from the top of the stack on the turntable to said supporting means after reproduction thereof.

21. In an automatic phonograph, a turntable for supporting a stack of records to be reproduced while supported thereon, a record supporting means disposed above said turntable for receiving and supporting the records in stack-like arrangement after play and in overhead spaced relation to the next record to be played, and record elevating mechanism disposed in operative relation to the turntable for transferring a record from the turntable to said supporting means, said elevating mechanism including a member movable into engagement with the exposed reproduced record for automatically positioning said mechanism into operative relation with such record and a companion member movable into supporting engagement with the underside of the record.

22. In an automatic phonograph, a turntable for supporting a stack of records to be successively reproduced thereon from the top to the bottom of the stack, record discarding elements positioned along the periphery of such stack for elevating movements relative thereto and for movement into and out of engagement with the exposed reproduced record of the stack for automatically positioning said elements with respect thereto, and means for actuating said elements into and out of engagement with a record and to elevate the same to a discarded position above and in axial alinement with the remaining records for exposing the next successive record for reproduction.

THEODORE M. WRIGHT.